July 23, 1968
F. G. LOGAN
3,394,298
DC POWER SUPPLY WITH LOAD POTENTIAL AND POLARITY DETERMINED BY
POTENTIAL AND POLARITY OF A DC INPUT SIGNAL
Filed Oct. 21, 1965
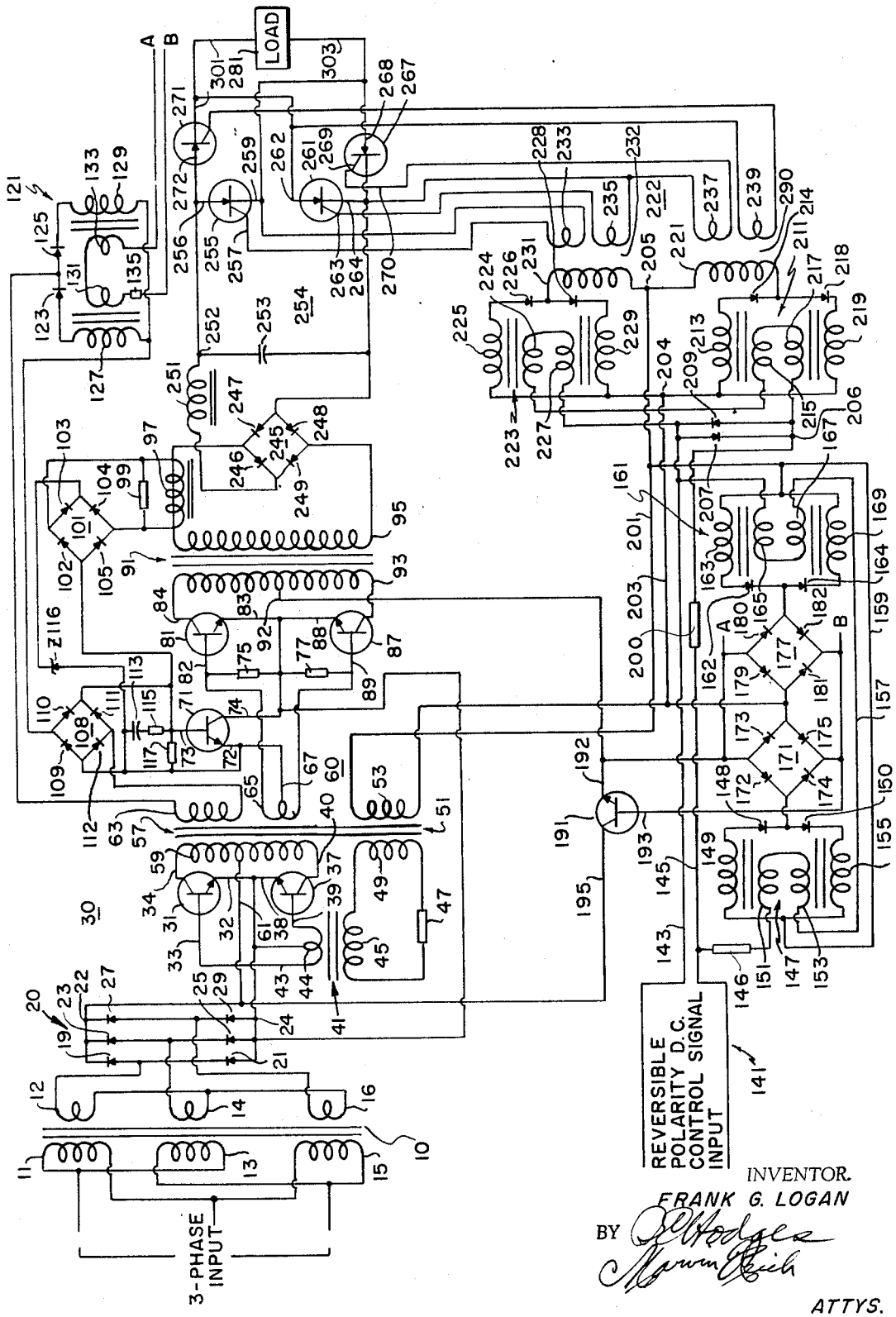
INVENTOR.
FRANK G. LOGAN
BY
ATTYS.

United States Patent Office 3,394,298
Patented July 23, 1968

3,394,298
DC POWER SUPPLY WITH LOAD POTENTIAL AND POLARITY DETERMINED BY POTENTIAL AND POLARITY OF A DC INPUT SIGNAL
Frank G. Logan, Bowie, Md., assignor to the United States of America as represented by the Secretary of the Navy
Filed Oct. 21, 1965, Ser. No. 500,448
10 Claims. (Cl. 321—2)

ABSTRACT OF THE DISCLOSURE

A DC power supply for delivering to a load a potential, the amplitude and polarity of which is determined by the amplitude and polarity of a DC control signal, includes an oscillator having an output frequency responsive to the potential of a rectified 3-phase AC input source connected to an amplifier, rectifier, filter and, through a static SCR polarity reversing switch, to the load. Control of load potential is obtained by means of a transistor switch connected between the oscillator and amplifier, which transistor is controlled by a magnetic amplifier pair connected to the DC control signal. The SCR polarity reversing switch is controlled by a magnetic amplifier pair, in turn controlled by the DC control signal. Short circuit protection of the load is provided by a diode connection between the DC control signal and the magnetic amplifier pair.

Zero power supply output with zero control signal input is achieved with a transistor switch connected to the amplifier and controlled by a magnetic amplifier, in turn controlled by the DC control signal. Power supply overload protection includes a transformer and Zener diode network, controlled by the load current connected to the zero signal control transistor switch.

---

The invention described herein may be manufactured and used by or for the Government of the United States of America for governmental purposes without the payment of any royalties thereon or therefor.

The present invention relates to DC power supplies and more particularly to the kind of power supply which delivers to a load a potential, the amplitude and potential of which is determined by the amplitude and polarity of a DC input signal.

The prior art contains power supplies for converting alternating current power to direct current power which operate satisfactorily for most purposes. Generally the prior art power supplies supply an amount of power which is determined by the demand of the load for the power within the limits of the capacity of the power supply. Additionally, some of the prior art power supplies are provided with voltage, current or power regulators. These regulators, within the capacity of the power supply, attempt to have a constant voltage, current or power output. However, the prior art power supplies are not capable of supplying a variable amount of power of reversible polarity in response to a variable control signal which is not dependent on the condition of the load. The prior art also teaches operation of oscillator-amplifier combinations on a volts per cycle basis, that is, to obtain changes in load potential, the potential applied to both elements is varied with a resulting change in both output potential and frequency. Because an oscillator-amplifier operated in this mode cannot operate at or near zero input potentials, smooth control cannot be obtained so there is discontinuity in control at low values of output. Further, the transistors in both the oscillator and amplifier are subjected to a range of voltages which is proportional to the range of output potential.

The present invention overcomes these difficulties in power supplies by providing a power supply which converts three phase alternating current electrical power to direct current electrical power of reversible polarity. The alternating current is rectified by a full wave diode rectifier which supplies direct current to the first oscillator stage. A control stage for delivering a variable amount of power is provided as a load for the oscillator. The output of the control stage is rectified and delivered to a switch which reverses the polarity of the output voltage supplied to the load device.

It is an object of the present invention to provide a DC power supply in which the load potential is steplessly controlled from zero to maximum.

Another object of the invention is to use a static double-pole-double-throw (DPDT) silicon controlled rectifier (SCR) switch for load potential polarity reversal so interlocked with the reversible polarity input signal as to prevent positive SCR gate currents that would unfortuitously fire both pairs of cooperative SCR switch members resulting in a short circuit of the power supply output.

A further object of the invention is to provide positive and simple power supply overload protection which can be adjusted readily to any desired value of overload current.

Another object of the invention is to obtain stepless and stable changes in load potentials from zero to maximum by operating the oscillator and transistor power amplifier at a relatively fixed frequency and voltage varying only the current supplied to the amplifier.

Another object of the invention is to use the input signal as the primary control for the several circuit functions to insure optimum tracking between output potential amplitude and polarity and the input signal amplitude and polarity.

Another object of the present invention is to provide a power supply having a reversible polarity direct current output.

Another object of the present invention is to provide a power supply having substantially no dead band of operation when zero current is being delivered to the load.

A further object of the invention is to provide a power supply having an excellent dynamic accuracy.

Still another object of the invention is to provide a reversible polarity direct current power supply which does not require mechanical switches for reversing the polarity of the load current.

Other objects and many of the attendant advantages of this invention will be readily appreciated as the same becomes better understood by reference to the following detailed description when considered in connection with the accompanying drawings wherein:

The sole figure of the drawing illustrates a circuit diagram of a power supply made in accordance with the teachings of the present invention. Alternating current from a three phase power supply is fed to the primary windings 11, 13 and 15 of a transformer 10. The secondary windings 12, 14 and 16 of transformer 10 are connected to the inputs of the power rectifier 20. The cathodes of diodes 19, 23 and 27 are connected to a first output terminal 22 of the rectifier 20 for supplying a positive bias voltage to the power supply. The anodes of diodes 21, 25 and 29 are connected to a second output terminal 24 of the rectifier 20 for supplying a negative bias voltage to the power supply. However, it should be understood that the three phase voltage source may be replaced by a single phase voltage source or that the alternating current source and associated rectifier may be replaced by a direct current voltage source. The anode of diode 19 is connected to the cathode of diode 21 and one terminal of the secondary winding 12.

A driving oscillator 30 converts the direct current supplied by the rectifier 20 to single phase alternating current. The oscillator 30 contains a first NPN transistor 31 having an emitter electrode 32, a base electrode 33 and a collector electrode 34 and a second transistor 37 having an emitter electrode 38, a base electrode 39 and a collector electrode 40. The emitter electrode 32 of transistor 31 is connected to the emitter electrode 38 of transistor 37 and the emitter 32 of transistor 31 is connected to the second output terminal of the rectifier 20. The base electrode 33 of transistor 31 is connected to one end of secondary winding 43 of transformer 41. The other end of the secondary winding 43 is connected to the base electrode 39 of the transistor 37. The center tap 44 on the secondary winding 43 is connected to the emitter electrode 38 of the transistor 39. The collector electrode 34 of transistor 31 is connected to one end of the primary winding 59 of the transformer 51. The other end of the primary winding 59 is connected to the collector electrode 40 of the transistor 37. The center tap 61 of the primary winding 59 is connected to the first output terminal of the rectifier 20. The primary winding 45 of transformer 41 and the secondary winding 49 of transformer 51 are interconnected to form a feedback network for the oscillator 30. More precisely one end of the primary winding 45 of the transformer 41 is connected to one end of the secondary winding 49 of the transformer 51. A resistor 47 connects the other end of the primary winding 45 to the other end of the secondary winding 49 completing the circuit.

The power amplifier and control circuit 60 contains a first transistor 81 having a base electrode 82, an emitter electrode 83 and a collector electrode 84 and a second transistor 87 having an emitter electrode 88, a base electrode 89 and a collector electrode 90. The emitter electrode 83 of transistor 81 is connected to the emitter electrode 88 of transistor 87. A bias resistor 75 has one of its ends connected to the base electrode 82 of transistor 81 and its other end connected to the emitter electrode 83 of transistor 81. A bias resistor 77 is connected between the base electrode 89 of transistor 87 and the emitter electrode 88 of transistor 87. A secondary winding 65 of the transformer 51 has one of its ends connected to the base electrode 82 of transistor 81 and its other end connected to the base electrode 89 of the transistor 87. Control transistor 71 having an emitter electrode 72, a base electrode 71 and a collector electrode 74 connected to the emitter electrode 83 of the transistor 81. The emitter electrode 72 of transistor 71 is connected to the center tap 67 of the secondary winding 65. The second output terminal of rectifier 20 is connected to the collector electrode 74 of the transistor 71.

A transistor 191 is utilized for supplying a controlled amount of power to the controlled amplifier stage 60. The emitter electrode 192 of transistor 191 is connected to the center tap 92 of the primary winding 93 of transformer 91. The collector electrode 195 of the transistor 191 is connected to the first output terminal of the diode rectifier network 20. The base electrode 193 is connected to the output terminal B of the diode rectifying networks 171 and 177.

A description of magnetic amplifiers and their operation appears in U.S. Patent No. 2,259,647 invented by Frank G. Logan. The magnetic amplifier 147 comprises a first winding 149 having one of its ends connected to the anode of diode 148. The cathode of diode 148 is connected to the anode of diode 150. The cathode of diode 150 is connected to one end of a winding 155 and the other end of the winding 155 is connected to the unattached end of the winding 149. A reversible polarity direct current control signal input is connected across terminal 141. One of the terminals 145 of the reversible polarity direct current input is connected through a resistor 146 to the primary winding 151 of the magnetic amplifier 147. The winding 151 is connected in series with the winding 153 of the magnetic amplifier 147. The unattached ending of the winding 153 is connected to the winding 167 of the magnetic amplifier 161. The other end of the winding 167 is connected to one end of the winding 165 of the magnetic amplifier 161. The other end of the winding 165 is connected to the other input terminal 143. The diode rectifier 171 comprises a diode 172 having its cathode connected to the anode of diode 174. A diode 174 having its cathode connected to the cathode of diode 175. A diode 173 having its cathode connected to the anode of diode 175 and its anode connected to the anode of diode 172. The junction A is connected to the anodes of diodes 172 and 173 and the junction B is connected to the cathodes of diodes 174 and 175. The cathode of diode 172 is connected to the cathode of diode 148 and the anode of diode 150. A second rectifying network 177 is provided with a diode 179 having its cathode connected to the anode of diode 181. The cathode of diode 181 is connected to the cathode of diode 182. The anode of diode 182 is connected to the cathode of diode 180. The anode of diode 180 is connected to the anode of diode 179. The anodes of diodes 179 and 178 are connected to the junction point A and the cathodes of diodes 181 and 182 are connected to the junction point B. The cathodes of diode 173 of the rectifying network 171 and of diode 179 of the rectifier 177 are connected to one end of the secondary winding 53 of the transformer 51. The other end of the secondary winding 53 is connected to the junction point of the windings 163 and 169 of the magnetic amplifier 161 and the junction point of windings 149 and 155 of the magnetic amplifier 147. The base electrode 193 of the transistor 191 is connected to the junction point B.

The rectifying networks 171 and 177 are the loads for the magnetic amplifiers 147 and 161 respectively. The output of the rectifying network is utilized to control the transistor 191 and the magnetic amplifier 121. The magnetic amplifier 161 is also provided with a winding 163 which has one of its ends connected to the anode of diode 162. The cathode of diode 162 is connected to the anode of diode 164. The cathode of diode 164 is connected to one end of a winding 169. The other end of the winding 169 is connected to the other end of the winding 163. The junction of the winding 161 and 169 is connected to the lead 201 which is in turn connected to one end of the secondary winding 53 of the transformer 51. The cathode of diode 162 is connected to the cathode of diode 180. The remainder of the control circuits is established by the control function of the transistor 71 which is cut off when there is no output signal on the control transistor 191. When the transistor 71 is in its cut off condition there is no bias supplied to the transistor 81 and the transistor 87 thereby assuring that they are in their cut off condition.

Now following the circuitry of the control system a secondary winding 63 of the transformer 51 has one of its ends connected to a rectifying diode bridge 108. More specifically the winding 63 is connected to the anode of the diode 111. Diode rectifying bridge has a first diode 109 whose cathode is connected to the anode of diode 110. The cathode of diode 110 is connected to the cathode of diode 111 and the anode of diode 111 is connected to the cathode of diode 112. The anodes of diodes 109 and 112 are connected together. The junction of the cathodes of the diodes 109 and 112 is connected to the emitter electrode 72 of the transistor 71. The cathodes of diodes 110 and 111 are connected to the base electrode 73 of the transistor 71. A resistor 117 is connected between the emitter electrode 72 of the transistor 71 and the base electrode 73 of the transistor 71. A resistor 115 has one of its ends connected to the base electrode 73 of the transistor 71 and its other end connected to one end of a condenser 113. The other end of the condenser 113 is connected to the junction of the anodes of diodes 109 and 112.

A second bridge diode rectifying network 101 is provided with a first diode 102 whose cathode is connected to the anode of diode 103. The cathode of diodes 103 and 104 are connected together. The anode of diode 104 is connected to the cathode of diode 105. The anodes of diodes 102 and 105 are connected together. The base electrode 73 of the transistor 71 is connected to the anodes of diodes 102 and 105. The other end of the condenser 113 is connected to the anode of a Zener diode 116. The cathode of the Zener diode is connected to the cathodes of diodes 103 and 104. The anode of diode 104 is connected to one end of a secondary winding 97 of the transformer 91. The other end of the secondary winding 97 is connected to the anode of diode 103. A resistor 99 is connected across the secondary winding 97 of the transformer 91. The magnetic amplifier 121 contains a diode 125 which has its cathode connected to one end of a first winding 129, the other end of a first winding 129 is connected to a first end of a second winding 127. The other end of 127 is connected to the anode of diode 123. The cathode of diode 123 is connected to the anode of diode 125. A winding 131 has one end connected to a winding 133 and its other end connected to one end of a resistor 135. The other end of resistor 135 is connected to a common junction point B. The other end of winding 133 of the magnetic amplifier 121 is connected to the common junction point A. A output winding 95 of the transformer 91 has one of its ends connected to the anode of diode 249 of the diode bridge rectifier 245. The cathode of diode 249 is connected to the cathode of diode 246. The anode of diode 246 is connected to the cathode of diode 247. The anode of diode 247 is connected to the anode of diode 248. The cathode of diode 248 is connected to the anode of diode 249. The other end of the secondary winding 95 is connected to the cathode of diode 247. A filter network is provided for filtering out the AC ripple that may get through the rectifying bridge network 245. This filter comprises a first inductive winding 251 having one of its ends connected to the cathode of diode 246 and its other end connected to a junction point 252. A capacitor 263 has one of its ends connected to the junction point 252 and its other end connected to the anode of diode 248.

A silicon control rectifier switching gate 254 has a silicon control rectifier 255 having an anode 256 connected to the junction point 252. The cathode 259 of the silicon control rectifier 255 is connected to terminal 303 of a load circuit 281. A silicon control rectifier 261 has its cathode connected to the anode of diode 248. The anode 262 of the silicon control rectifier 261 is connected to the terminal 301 of the load 281. A third silicon control rectifier 267 has its cathode connected to the anode of diode 248. The anode 268 of the silicon control rectifier 267 is connected to the input terminal 303 of the load 281. A fourth silicon control rectifier 271 has its anode 272 connected to the junction point 252 and its cathode 274 connected to the input terminal 301 of the load 281. The four silicon control rectifiers function as a reversible polarity switch to be explained hereafter during the operation of the circuit.

The control of the silicon control rectifier is accomplished by magnetic amplifier networks 211 and 223 and their associated circuitry. A resistor 200 is connected between the input line 145 and the junction 206. A first diode 207 has its anode connected to line 143 and its cathode connected to junction 206. A second diode 209 has its anode connected to the junction point 206 and its cathode connected to the input line 143.

The magnetic amplifier 211 has one end of a winding 213 connected to the anode of a diode 214. The cathode of the diode 214 is connected to the anode of a diode 218. The cathode of diode 218 is connected to one end of winding 219. The other end of the winding 219 is connected to the other end of a winding 213. An inner control winding 217 has one of its ends connected to a junction point and its other end connected to one end of the winding 215. The other end of winding 215 is connected to one end of winding 225 of the magnetic amplifier 223. The other end of the winding 225 is connected to one end of the winding 227. The other end of the winding 227 is connected to the input line 143. The winding 224 has one of its ends connected to the anode of diode 226. The cathode of diode 226 is connected to the anode of diode 228. The cathode of diode 229 is connected to one end of the winding 224. The other end of the winding 224 is connected to the other end of the winding 229. The other ends of the windings 224 and 229 are then connected to the junction point 204 as are the other ends of the windings 219 and 213. The line 203 interconnects the junction point 204 with the secondary winding 53 of the transformer 51. The magnetic amplifier 223 is provided with an output transformer 232. The primary winding 231 is connected between the cathode of diode 226 and the junction point 205. Similarly, the magnetic amplifier 211 has a transformer 222 having a primary winding 221 connected between the junction point 205 and the cathode of diode 214. The junction point 205 is connected to the line 201 which is connected to the secondary winding 53 of the transformer 51. The secondary winding 233 is connected between the control electrode 257 and the cathode 259 of the SCR 255. Similarly, the secondary winding 235 is connected between the control electrode 263 and the cathode 264 of a silicon control rectifier 261. The secondary winding 237 is connected between the control electrode 264 and the anode 207 of the silicon control rectifier 267. The secondary winding 239 is connected between the cathode 274 and the control electrode 273 of the silicon control rectifier 271. It is to be noted that the aforementioned transformers control the silicon control rectifiers so that they act as a by-directional switch putting a positive or negative potential across the load 281.

The operation of the illustrated circuit is as follows: three phase input potential is placed on transformer 10 the output of which is rectified in the rectifying network 20 forming a direct current voltage at the first and second rectifier output. It is to be noted that if a single phase voltage supply is available then only a single phase rectifying network and transformer would be provided alternatively if only a direct current potential is available then the direct current potential could be utilized without any rectification whatsoever. The rectified current is supplied to oscillator stage 30.

The oscillator stage takes the direct current potential provided to it and converts it to an alternating current potential of the desired frequency. The oscillator stage 30 supplies the AC power to the magnetic amplifier stages 147 and 161 for controlling the transistor 191 and also supplies the alternating current to secondary 63. The AC power for operating the magnetic amplifier 223 and 211 is derived in the secondary winding 53 of the transformer 51 of the oscillator stage 30. Similarly the AC power for operating the magnetic amplifier 121 is derived from the secondary winding 63 of the transformer 51 of the oscillating stage 30. To understand the operation of the various parts of the circuit references will be made to the components and parts interchangeably so that the explanation will be clear, however, it is to be understood that all the control functions operate simultaneously and instantaneously. Proceeding, the AC power developed in the oscillator 30 is coupled to the base electrodes 82 and 89 of the transistors 81 and 87 by way of the secondary winding 65 of the transformer 51. This AC signal is amplified by the transistors 81 and 87. The amount of amplification or more distinctly the amount of B+ supplied to the transistors 81 and 87 depends on the conductive state of the transistor 191. This type of oscillator which operates at a frequency determined by the DC potential supplied to it is well known in the art. Transistor Circuit Design" McGraw-Hill Book Co., 1963, pp. 437–438, discusses this circuit in detail. In the mode of operation disclosed, it is assumed that the input potential to the oscillator is relatively fixed so its operating frequency is relatively fixed.

Centering our attention for a moment on the input of a reversible polarity DC control signal which controls the amount of current being supplied to the rectifying networks 171 and 177 as follows. The amount of DC applied in a positive direction would control the amount of conductivity of the magnetic amplifier 147 thereby supplying an AC signal to the diode rectifying bridge 171 for rectification. The negative input signal supplied by the reversible polarity DC control signal would control the amount of current supplied by the magnetic amplifier 161 to the diode rectifying bridge 177. Either the rectifying bridge 171 is in operation supplying a rectified output to the terminals A and B and to the base electrode 193 of the transistor 191 or alternatively the diode bridge rectifying circuit 177 supplies the current to the base electrode 193 and the transistor 191. The amount of rectified current being supplied between the base and emitter electrodes of the transistor 191 controls the amount of B+ permitted to be conducted through the transistor 191 to the transistors 81 and 87 thereby controlling the amount of output fed to the transformer 91. The DC output potential which has been developed across the diode bridge networks 171 and 177 is supplied to the magnetic amplifier 121 for controlling the amount of magnetic amplification of the magnetic amplifier 121. This magnetic amplifier 121 in turn determines the amount of power supplied to the diode bridge network 108 thereby controlling the amount of the signal supplied between the emitter electrode 72 and the base electrode 73 of the transistor 71. When there is no output at terminals A and B then the magnetic amplifier 121 is nonconducting as a result thereof and there is no power supplied to the bridge network 108 and therefore there is no bias potential supplied to the transistor 71. The winding 97 of the transformer 91 is provided as a means for sensing the amount of output current from the amplifying stage 91. This output voltage is then rectified by the diode bridge rectifier 101 in the event that the current sensed by the coil 97 is greater than the predetermined amount. Then, the voltage rectified by the diode bridge rectifier 101 is sufficient to break down the zenor diode 116 thus supplying a back bias to the transistor 71. This back bias reduces the conductivity of the transistor 71 thereby reducing the amount of the amplification of the transistors 81 and 87. Reducing the amplification of the transistors 81 and 87 reduces the amount of current and voltage on the output winding 95 of the transformer 91 thereby establishing a means of preventing the output voltage and current in the winding 95 from being greater than the predetermined amount. The alternating current supplied in the output winding 95 of the transformer 91 is rectified by a diode bridge rectifying network 245. The rectified power or current is fed through a filter network 251 to a filter condenser 253. The filter condenser 253 and conductor 251 eliminates the ripple effect from the diode bridge network 245.

The diodes 207 and 209 limit the amount of available DC signal supplied to the magnetic amplifiers 211 and 223. The aforementioned signal is limited to the forward conducting potential of the diodes 207 and 209. Now, further assuming that the reversible polarity DC control signal is of a positive nature then the gate turn off silicon controlled rectifiers 255 and 261 will be in their conductive conditions. This happens because the magnetic amplifier 223 has an output signal on primary winding 221 of the transformer 222. This potential is sensed by the secondary windings 237 and 239 which fire the silicon controlled rectifiers 271 and 267. When the reversible polarity DC signal changes from positive and goes through its negative condition the deflation of the field causes a negative pulse to be generated which when induced into the secondary windings 237 and 239 by transformer action is sufficient to cut off the silicon controlled rectifiers 257 and 271. When the reversible polarity DC control signal has become negative then the magnetic amplifier 211 will no longer conduct and the magnetic amplifier 223 will conduct thereby having an output on the primary winding 231 of the transformer 232. The secondary windings 233 and 235 sends the signal supplied by the magnetic amplifier 223. This signal is then transmitted to the silicon controlled rectifiers 255 and 251 thereby reversing the polarity of the output voltage. It is noted when the silicon controlled rectifier 271 is conductive a positive potential is delivered to the terminal 301 and a negative potential is delivered to the terminal 303. However, when the silicon controlled rectifier 255 and the silicon controlled rectifier 261 is conducting the positive potential is delivered to the terminal 303 and the negative potential is delivered to the terminal 301. Once again emphasizing the important operational features of the present invention, the power transformer 10 and rectifier diodes 19, 21, 23, 25, 27, 29 form a conventional 3-phase full wave rectifier power supply. This rectifier supplies power to a square wave oscillator consisting of saturating transformer 45, non-saturating transformer 51 having secondary windings 63, 65, 53 and transistors 31, 37. This type of oscillator which operates at a frequency determined by the DC potential supplied to it is well known in the art. "Transistor Circuit Design" McGraw-Hill Book Co., 1963, pp. 437–438, discusses this circuit in detail. In the mode of operation disclosed, it is assumed that the input potential to the oscillator is relatively fixed so its operating frequency is relatively fixed.

The base-emitter circuits of transistors 81, 87 which, together with transformer 91 form an amplifier, are driven alternately into conduction by currents derived from centertapped secondary 65 of transformer 57. The collector-emitter circuit of transistor 71 is in series with the common emitter return lead of transistors 81, 87 and its purpose will be explained later.

Secondary winding 95 of transformer 91 supplies alternating current (AC) potential to the full wave bridge rectifier 245. The output of rectifier 245 is filtered by series reactor 251 and shunt capacitor 253.

The DC output of rectifier 245 is applied to load 281 through cooperating pairs of SCR's 255–261, 267–271 which form a static DPDT reversing switch. If, for example, positive gate currents sufficient to cause conduction flow in the gate circuits of SCR's 255–261, terminal 303 of load 281 is positive, terminal 301 negative. When SCR's 267–271 are conducting the polarity of load 281 reverses, i.e., terminal 301 is positive and terminal 303, negative.

Assuming transistor 71 to be conducting and with an appropriate pair of reversing switch SCR's, say 255–261, conducting operation of the power circuit is as follows:

With the circuit energized a current path may be traced from the positive terminal 22 of rectifier 30 through the series collector-emitter circuit of transistor 191 to the center tap on the primary of transformer 91. Current will then flow from one of the opposite ends of the transformer primary through the collector-emitter circuits of either transistor 81 or 87, depending upon which is conducting at the moment. The common emitter lead of 81, 87 is returned to the negative terminal 24 of rectifier 30 thus completing the circuit. Voltage induced in secondary 95 of transformer 91 is applied to the AC terminals of rectifier 245 and the DC output of this rectifier applied to the load.

If transistor 191 is saturated, maximum load potential is obtained; when transistor 191 is cut off, no potential is applied to load 281. With transistor 191 conducting currents between zero and maximum, by variation of base-emitter current, values of load potential are obtained between the limits of zero and maximum.

Base-emitter current for the control of transistor 191 is derived from rectifier diode bridge 171 with regulated power supplied by magnetic amplifier 147 and by diode bridge 177 supplied by magnetic amplifier 161. Magnetic amplifiers 147 and 161 are of the self-saturating type with the magnitude of output current determined by control current polarity and amplitude. These amplifiers operate from voltage supplied by secondary 53 of transformer 57, of the square wave oscillator 30 previously described.

The type of amplifier shown is disclosed in U.S. Patent No. 2,259,647 issued to Frank G. Logan, and a complete description and analysis of operation is given in "Magnetic-Amplifier Circuits," W. A. Geyger, McGraw-Hill Book Co., 1954, Ch. 11.

Because these amplifiers are signal polarity sensitive, control windings 151–153 and 215–217 are connected in series but so poled that the output of, say, amplifier 151 increases with an input signal of one polarity and that of 161 increases with a signal of opposite polarity. This arrangement insures a positive base current in the base-emitter circuit of transistor 191 with input signals of either polarity.

As stated herein, a static DPDT SCR switch is used to determine load polarity. An SCR is in the conductive state when a positive potential is applied to the gate of the gate-cathode circuit and gate current flows in excess of a critical value and load current will flow if a positive anode potential is then applied. If the gate current is less than this critical value, the SCR is in the non-conductive state and no load current flows when a positive potential is applied to the mode.

Currents in the gate-cathode circuits of SCR 255–261, which determine one load polarity when conducting, are derived from secondaries 233, 235 of transformer 232. The magnitude of the gate current is determined by the degree of saturation of magnetic amplifier 223 is set by the amplitude and polarity of the current in control winding 224–227. In like fashion, SCR 267–271 gate currents are derived from secondaries 237-239 on transformer 290. Control windings 215–217 and 224–227 are serially connected and oppositely poled so one tends to saturate for a signal current of one polarity and the other for a signal of opposite polarity. Potential for both amplifiers 211, 223 is derived from secondary 53 of transformer 57.

Control currents for the amplifiers are derived from the reversible polarily, DC control signal source. Unlike amplifiers 151, 161 where it is desired that output current be linearly related to input control signal amplitude, amplifiers 223, 211 should be controllable with the lowest practicable input signals in order to minimize the load potential dead band around zero output. Amplifiers of the type described here have some maximum value of negative control current which produces minimum load current. If this maximum negative control current is exceeded, the amplifier output increases. If, for example, amplifiers 223, 211 were designed to deliver at least the minimum required gate current to render their respective pairs of SCR switch elements conductive at ±1% of the maximum input signal, excessive negative control currents would flow at 100% signal and the amplifier controlling the non-conducting pair of SCR switch elements would rise and fire the SCR which would result in short circuiting the power supply output.

To prevent the short circuit mentioned above, diodes 207, 209 are reverse connected across the source of control potential with a resistor 200 limiting the current drawn from the signal input source. This limits the potentials of either polarity applied to control windings 215–217, 224–227 to the diode forward voltage drop. As diodes with forward drops ranging from about 0.1 to 1.5 volts are available, the particular design of the amplifiers to meet the desired characteristics of this circuit presents no problem.

Magnetic amplifier 121 and diode rectifier bridge 108, deriving potential from secondary 63, transformer 57, supply positive base current to the base-emitter circuit of transistor 71, which is in series with the emitter returns of transistors 81, 87 of the power amplifier. Circuit constants are such that in the absence of positive control current in winding 131–133, amplifier 121, transistor 71 is cut off reducing the base-emitter currents of transistors 81, 87 to essentially zero. When positive control current flows in control winding 131–133 transistor 71 conducts establishing a path for base-emitter currents for transistors 81, 87 from the oscillator secondary winding 65. Control currents for amplifier 121 is derived from either diode rectifier bridge 171 or 177, depending upon signal polarity, terminals A and B of control winding 131–133 being connected to terminals A and B of the rectifier output. This circuit, then, cooperates with transistor 191 and its control thereby insuring that the power supply output is zero with zero signal.

Power supply overload protection is obtained by a circuit which includes current transformer 97, resistor 99 shunting the current transformer secondary winding, diode rectifier bridge 101 and Zener diode 116. Current transformer 97 is in an AC lead to bridge rectifier 245 and its secondary current reflects load current. The potential applied to rectifier 101 is then a function of load current and the resistance of shunt resistor 99. A circuit is established between the positive terminal of rectifier 101 and the emitter of transistor 71. The rectifier negative terminal is connected to the base of the transistor. Zener 116 is shown in series with the positive output of 101. Circuit constants may be arranged such that at a pre-selected value of power supply output current, the DC output potential of rectifier 101 will exceed the breakdown voltage of Zener 116. This will result in a potential of opposite polarity to that of rectifier 108 being applied to the base-emitter circuit of transistor 71 tending to more or less cut it off. This, in turn, will limit the base-emitter currents of transistors 81, 87 and maintain the power supply output current at the preselected value.

Obviously many modifications and variations of the present invention are possible in the light of the above teachings. It is therefore to be understood that within the scope of the appended claims the invention may be practiced otherwise than as specifically described.

What is claimed is:
1. A reversible-polarity direct-current power supply for supplying controlled power to a load comprising:
   rectifying means for producing a direct current voltage connectible to a source of alternating current;
   oscillator means for converting direct current voltage to an alternating current connected to said rectifying means;
   power amplifier means connected to the output of said oscillator means;
   said power amplifier means being connectible to a load;
   first switch means connected between said oscillator means and said power amplifier means for regulating the amount of power applied to said load;
   said first switch means having a control input thereto;
   a direct current control signal;
   first magnetic amplifier means;
   said control signal being applied to said first magnetic amplifier means; and
   said first magnetic amplifier means being coupled to the control input of said first switch means for controlling the same, the control thereby being responsive to variations in said control signal;
   whereby the amount of power applied to said load is governed by variations of said control signal.

2. A reversible-polarity direct-current power supply as set forth in claim 1 further comprising:
   silicon controlled rectifier switching means connected between said power amplifier means and said load for reversing the polarity of voltage applied to said load;
   second magnetic amplifier means connected to said silicon controlled rectifier switching means for controlling the same;

said second magnetic amplifier means being connected to said control signal and responsive to the polarity thereof;

whereby the polarity of voltage applied to said load will be responsive to the polarity of said control signal.

3. A reversible-polarity direct-current power supply as set forth in claim 2 further comprising:
third magnetic amplifier means connected to said control signal;
second switch means connected to said power amplifier means for controlling the same;
said second switch means having a control input connected to said third magnetic amplifier means;
said magnetic amplifier means causing said switch to reduce to substantially zero the amount of power delivered to said load by said amplifier whenever said control signal is substantially zero.

4. A reversible-polarity direct-current power supply for supplying a controlled amount of power comprising:
a source of direct current voltage;
means for converting said direct current voltage to an alternating current voltage having an output and an input connected to said direct current source;
first and second electronic valves having input, output and common electrodes;
a transformer having a secondary winding and a center-tapped primary winding;
one end of said primary winding being connected to said output electrode of said first electronic valve and the other end of said primary winding being connected to said output electrode of said second electronic valve;
means responsive to a direct current control signal coupled between said center tap of said primary winding and said source of direct current voltage;
said common electrode of said first and second electronic valves being connected together, said converting means output being coupled to said input electrodes of said first and said second electronic valve;
a rectifying network means connected to said secondary winding of said transformer having first and second output terminals; and
means responsive to a reversible-polarity direct-current control signal connected to said rectifying network means for reversing the polarity of the output voltage connected to said rectifying network means.

5. A power supply as defined in claim 4 but further characterized by said source of direct current voltage comprising rectifying means, having an input means and an output means.

6. A power supply as defined in claim 5 but further characterized by said means for converting said direct current voltage to an alternating voltage output being a transformer having a centertapped secondary winding having a pair of ends, a first secondary winding end being connected to said input of said first electronic valve and said second secondary winding end being connected to said input electrode of said second electronic valve;
means responsive to said direct current control signal for cutting off said first and second electronic valves when said direct current control signal is zero;
said cutting off means being connected between said center tap of said centertapped secondary winding and said common electrodes of said first and said second electronic valves.

7. A power supply as defined in claim 6 but further characterized by having said means for reversing the polarity of the output voltage comprising first, second, third and fourth silicon controlled rectifiers each having an anode and a cathode, said anodes of said first and second silicon controlled rectifier being connected to a first output terminal of said rectifying network means and said cathode of said silicon controlled electrode being connected to a first load terminal, said cathode of said second silicon controlled rectifier being connected to a second load terminal, said cathodes of said third and fourth silicon controlled rectifiers being connected to said second output terminal of said rectifying network means, said anode of said third silicon controlled rectifier being connected to said first load terminal, and said anode of said fourth silicon controlled rectifier being connected to said second load terminal.

8. A power supply as defined in claim 7 but further characterized by said first, second, third and fourth silicon controlled rectifiers each having a control electrode, first magnetic amplifier means coupled between the control electrodes of said second and third silicon controlled rectifiers and said source of reversible polarity direct current control signal; and a second magnetic amplifier means coupled between the control electrodes of said first and fourth silicon controlled rectifiers and said source of reversible polarity direct current control signal.

9. A power supply as defined in claim 8 but further characterized by said means responsive to said direct current control signal being coupled between said center tap of said primary winding and said source of direct current voltage comprising a transistor having a collector electrode and a base electrode, an emitter electrode connected to said center tap of said centertapped primary winding and said collector electrode connected to said source of direct current voltage and a magnetic amplifier and coupled rectifying network connected between said source of said reversible polarity direct current control signal and said base electrode of said transistor.

10. A power supply as defined in claim 5 but further characterized by said means for reversing the polarity of the output voltage comprising a first, second, third and fourth silicon controlled rectifiers each having an anode and a cathode, said anodes of said first and second silicon controlled rectifiers being connected to a first output terminal of said rectifying network means and said cathode of said silicon controlled rectifier being connected to a first load terminal, said cathode of said second silicon controlled rectifier being connected to a second load terminal, said cathode of said third and fourth silicon controlled rectifier being connected to said second output terminal of said rectifying network means, said anode of said third silicon controlled rectifier being connected to said first load terminal and said anode of said fourth silicon controlled rectifier being connected to said second load terminal.

References Cited
UNITED STATES PATENTS

| 3,192,464 | 6/1965 | Johnson et al. | 321—2 |
| 3,327,199 | 6/1967 | Gardner et al. | 321—2 |
| 3,335,316 | 8/1967 | Schneider | 321—2 X |

FOREIGN PATENTS

| 1,133,026 | 7/1962 | Germany. |

OTHER REFERENCES

IBM Technical Disclosure Bulletin, "Reversible Motor Control," vol. 5, No. 12, May 1963, p. 54.

LEE T. HIX, *Primary Examiner.*

W. H. BEHA, JR., *Assistant Examiner.*